United States Patent [19]
Dowlati et al.

[11] Patent Number: 5,925,164
[45] Date of Patent: Jul. 20, 1999

[54] FINSHIELD ASSEMBLIES FOR FIBER-FORMING APPARATUS

[75] Inventors: Ramin Dowlati, Gahanna; Timothy A. Sullivan, Granville; Jack L. Emerson, Newark, all of Ohio; James L. Hare, Canyon, Tex.

[73] Assignee: Owens Corning Fiberglas Technology, Inc., Summit, Ill.

[21] Appl. No.: 08/812,619

[22] Filed: Mar. 7, 1997

[51] Int. Cl.⁶ .................................. C03B 5/44; F27B 7/38
[52] U.S. Cl. ..................... 65/511; 65/481; 65/488; 65/495; 65/498; 65/510; 65/512; 165/DIG. 452; 165/DIG. 461; 165/DIG. 462; 165/DIG. 463; 165/DIG. 486; 261/156; 137/338
[58] Field of Search .............................. 65/481, 488, 495, 65/498, 510, 511, 512; 137/338; 165/DIG. 452, DIG. 461, DIG. 462, DIG. 463, DIG. 486; 261/156

[56] References Cited

U.S. PATENT DOCUMENTS

| | | |
|---|---|---|
| 1,313,730 | 8/1919 | Pease . |
| 1,335,997 | 4/1920 | Spery . |
| 3,251,665 | 5/1966 | Bour .................................. 65/512 |
| 3,264,076 | 8/1966 | Veazie et al. . |
| 3,345,147 | 10/1967 | Russell ............................. 65/511 |
| 3,522,025 | 7/1970 | Smith .............................. 65/512 |
| 3,988,135 | 10/1976 | Coggin, Jr. . |
| 4,541,853 | 9/1985 | Sullivan et al. .................. 65/512 |
| 4,566,890 | 1/1986 | Hostler et al. ................... 65/512 |

*Primary Examiner*—Peter Chin
*Assistant Examiner*—Michael P. Colaianni
*Attorney, Agent, or Firm*—C. Michael Gegenheimer; Inger H. Eckert

[57] ABSTRACT

A heat-absorbing finshield assembly, which is located adjacent the discharge area of a furnace for producing glass fibers, includes fins spaced along a fluid-cooled manifold such that the fins extend between, but not in contact with, the molten glass fibers emerging from the furnace. The fins may have microfins in their bases which are in contact with the cooling fluid. The fins also may be of variable thicknesses relative to each other along the manifold to absorb different quantities of heat from the emerging fibers.

19 Claims, 7 Drawing Sheets

FINSHIELD ASSEMBLIES FOR FIBER-FORMING APPARATUS

TECHNICAL FIELD AND INDUSTRIAL APPLICABILITY OF THE INVENTION

The present invention relates to heat-absorbing fin assemblies or finshields for use with glass-fiber manufacturing apparatus. More particularly, the instant invention relates to heat-absorbing fin assemblies located adjacent to the discharge side of a bushing from which glass fibers are pulled.

BACKGROUND OF THE INVENTION

A standard process for making glass fibers is to pull molten glass from a melting furnace through devices referred to as bushings. Bushing devices include plates, located at the discharge area of the furnace, which contain a plurality of closely spaced, relatively small orifices or tips through which the molten glass is pulled. The glass is pulled in continuous filaments or fibers, and the plural filaments are gathered and wound onto a spool for later use. Between the bushing orifices, or tips, and the winding apparatus, the glass filaments are attenuated, followed by coating with a sizing material.

Greater industry demand for glass fibers has resulted in the development of glass melters having bushings with an increased number of orifices or tips, thus creating a greater filament discharge per furnace (throughput). However, larger bushings have led to uneven heat patterns across the bushing; thus, the pulled glass filaments typically are of different temperatures as they exit the bushing. Moreover, the filaments are pulled at a greater throughput than in the past, thus requiring more efficient heat quenching thereof. The glass fibers must be properly cooled to achieve proper attenuation, and the cooling must be achieved taking into account the increased bushing size and increased throughput, as well as uneven temperatures in the glass filaments.

Prior cooling systems have utilized jets for blowing gas on the glass fibers as they exit the bushing. See, for example, U.S. Pat. No. 3,988,135. The use of a gas stream directed at the emerging filaments can cause the filaments to bend or to otherwise move. Clearly this is disadvantageous to maintaining uniform glass filaments.

The use of finshields having heat-absorbing fins attached to a fluid-cooled manifold and located adjacent to the area from which the filaments exit the bushing represents an attempt to cool the fibers so as to achieve proper attenuation. See U.S. Pat. No. 3,264,076. This method uses fins which are pre-angled along the finshield so as to accommodate the filaments being pulled at an angle as they are gathered below the tip plate. This method has served to lower the filament temperatures for proper attenuation only in furnaces having relatively lower outputs, fewer bushing tips, and moderate throughput speeds. Attempts to use these conventional finshields in processes with large bushings and high throughput speeds have encountered numerous problems.

For example, because they are being gathered from larger tip plates, steeper angled blades are required for the outermost filaments. However, increasing the angle of the blades increases the risk that, after a process interruption, the emerging beads may contact the fins, agglomerate, stick to the blades, and result in a flooded tip section.

Accordingly, the increased demand for glass fibers and resultant increase of bushing sizes and throughput speeds has created a need for improved heat-absorbing finshield devices in cases where dimensional constraints limit the use of thicker or larger fins to provide increased cooling capacities.

SUMMARY OF THE INVENTION

The present invention is directed to finshield assemblies for use in glass-fiber producing systems which obviate one or more of the problems or limitations of conventional fiber-cooling systems. The invention involves a heat-absorbing finshield system having angled fins wherein fin base portions are directly in contact with cooling fluid flowing within a manifold. Further, the invention relates to an advantageous comb-like or microfin design of the fin base portions which extend into, and are in contact with, the cooling fluid within the manifold. Also, the invention relates to fins wherein the portions thereof that are adjacent the fiber streams are of variable thicknesses such that the finshield assembly will absorb varying amounts of heat from the fiber streams exiting across the bushing.

Additional objects, aspects, features, and advantages of the invention will be apparent from the detailed description below and the appended drawings.

DETAILED DESCRIPTION AND PREFERRED EMBODIMENTS OF THE INVENTION

It has long been recognized that when glass fibers are made by drawing or pulling molten glass through tips in a bushing plate, the exiting filaments or fibers must be attenuated to the final fiber diameter desired. Attenuation must be achieved very soon after the filament is pulled from the bushing, while the filament is sufficiently hot to achieve attenuation but not so hot as to allow attenuation to a diameter smaller than desired.

Figure 3A:
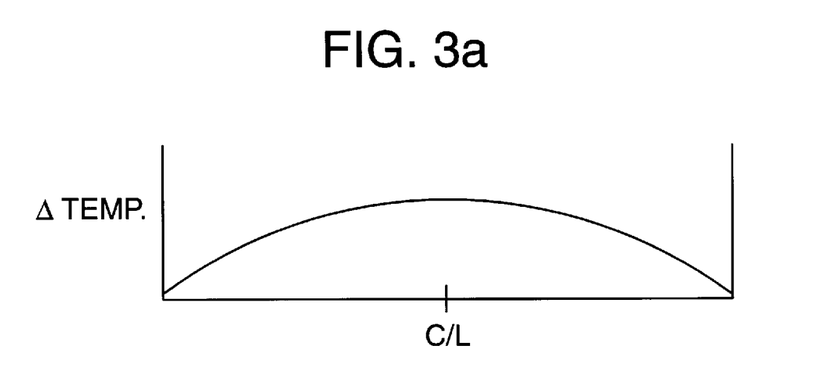
FIGS. 3a and 3b show illustrative temperature distributions across a bushing and tip plate.
Figure 3B:
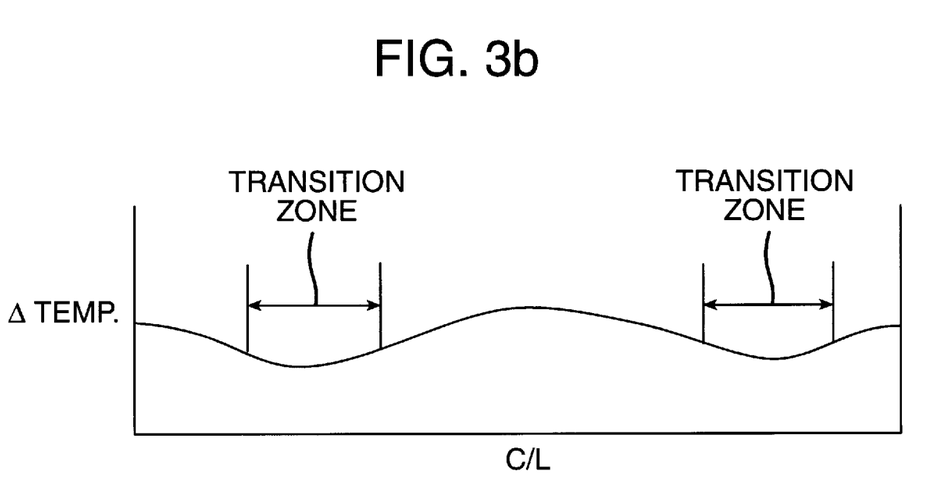

FIG. 3a illustrates a typical temperature distribution of molten glass across a bushing block as it is delivered to a bushing screen or tip plate. The y-axis represents the temperature of the glass melt and the x-axis represents the longitudinal location of the bushing, with the center line (C/L) being at the middle of the x-axis. As can be seen, the highest temperatures occur near the center of the bushing block while the coolest temperatures occur around the edges of the bushing. FIG. 3b shows the temperature profile of the molten glass delivered from a bushing screen having uniformly spaced and sized holes (e.g., 144 holes per square inch each having a 0.055 inch diameter). As can be seen, the temperatures are not uniform or equalized, but include regions or zones of temperature transition.

The temperature of the exiting streams or filaments of molten glass must be controlled to achieve the proper attenuation of all the filaments simultaneously. To this end, filament-quenching devices known as finshields are mounted directly below the bushing.

Improvements in the general fiber-forming apparatus are achieved by finshield assemblies according to the invention. A finshield assembly includes fin blades acting as heat absorbers that extend near to, but not in contact with, the glass filament stream to extract heat from the moving filament and dissipate the heat away from the moving filament. The heat-absorbing fin blades, or fins, are attached to a manifold having a heat-absorbing fluid (e.g., cooling water) moving therethrough, such that heat absorbed by the fins is transferred to the fluid as it is moving through the manifold and thus further dissipated away from the moving glass filament.

Figure 1:
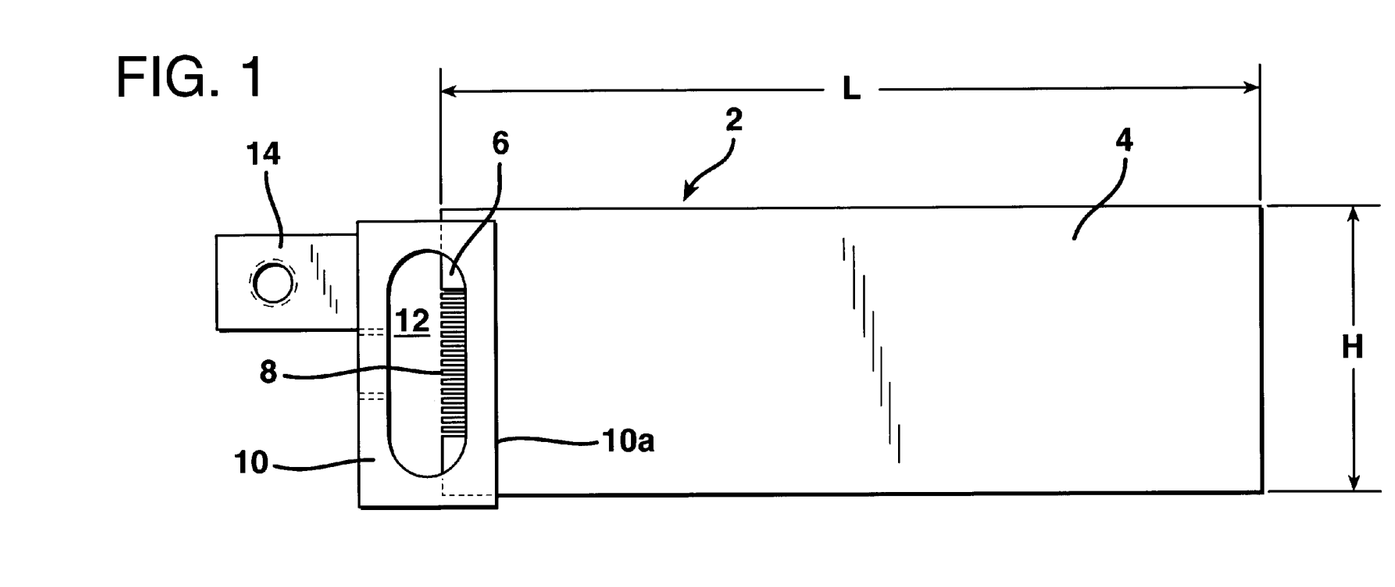
FIG. 1 is a side elevation, partially in cross-section, of a preferred embodiment of the invention.
Figure 6:
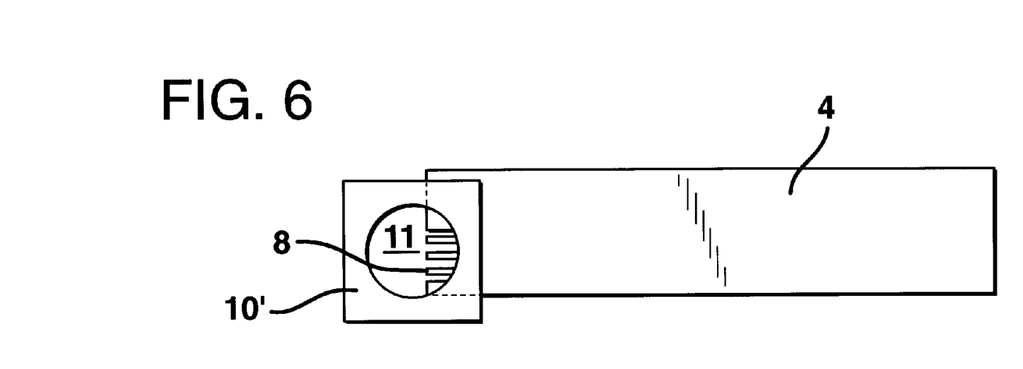
FIG. 6 illustrates an alternative embodiment of a manifold.

In the embodiment or aspect of the invention shown in FIG. 1, fin blade or fin 2, which is preferably rectangular and formed of solid copper or nickel-plated copper but can be made of any suitable material having sufficient thermal conductivity and stability, is comprised of a blade section 4 and a base section 6. The blade section 4 is that area of the fin past which the glass filaments travel as they exit the bushing. The base section 6 of the fin blade is attached to manifold 10, which is mounted under a tip plate using suitable means, such as a mounting bracket 14. The manifold 10 is preferably a hollow, pipe-like device, and has a plurality of fins attached, such as by soldering, along its length, e.g., to extend outwardly in one direction along an outer wall 10a of the manifold. Preferably, the fins are tilted at an angle from perpendicular to the longitudinal axis of the finshield 1 or angled from 0° from the vertical in the center to plus or minus 8° or more from the vertical at the outer ends of the finshield to allow the glass filaments to be collected together below the finshield without contacting the fins. The interior section or flow channel 12 of the manifold is preferably oblong in cross-section (as shown in FIG. 1) and is adapted to have a cooling fluid, usually water, flow through its length. Alternatively, a manifold 10' having a flow channel with a circular cross-section 11 as shown in FIG. 6 may be used. The manifold flow channel is in communication with an inlet or source of the cooling fluid and an outlet for the cooling fluid.

Figure 2:
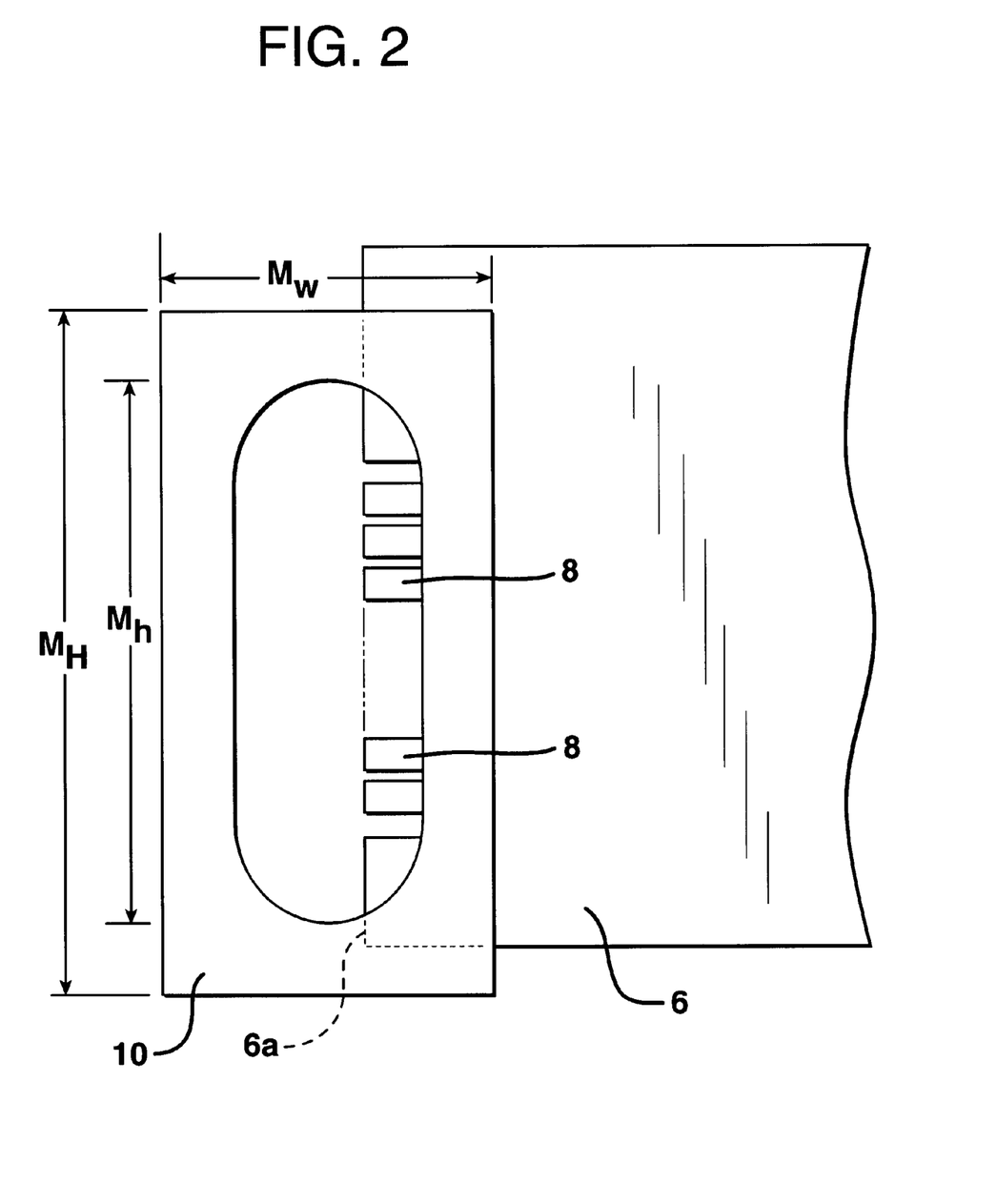
FIG. 2 is an enlarged view of a portion of FIG. 1.
Figure 9:
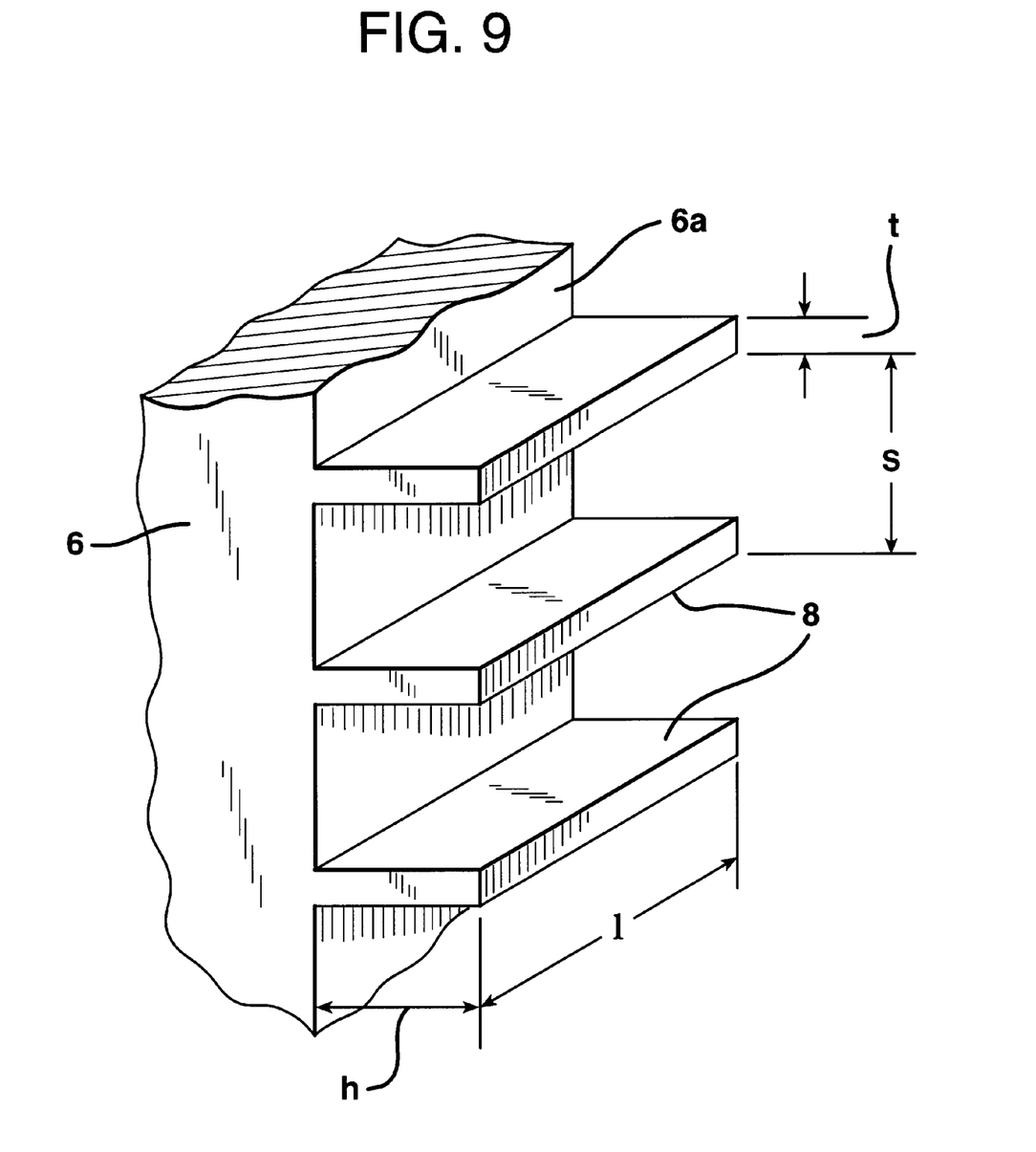
FIG. 9 is a view illustrating microfins of a fin blade.

As illustrated in FIGS. 1, 2, and 9, in preferred embodiments of the invention the base portion of each fin blade has teeth or microfins 8 formed therein. The microfins 8, which are preferably rectangular and may be formed by machining or cutting notches into the fin base portion 6, preferably extend across end 6a of base portion 6 such that when the fin blades are inserted into slots in the manifold 10, the microfins are aligned with the straight portion or side of the oblong shape of the flow channel (see FIG. 2). The heat-exchanging manifold has a plurality of fins 2 attached to wall 10a along its length, and the microfins 8 of each fin are in contact with the cooling fluid in the flow channel. The microfins impart a turbulence to the flowing cooling fluid as well as act to increase the surface area of the portion of the fin in contact with the cooling fluid. The microfins thus allow greater amounts of heat to be dissipated, and this in turn serves to achieve faster heat quenching of the moving glass filament. As noted above, in modern bushing assemblies, faster-moving filaments require faster heat transfer from the filaments to a cooling means. The use of microfins in the base portion of the heat-absorbing fin and in contact with the cooling fluid within the manifold serves to accomplish this.

In preferred embodiments of the finshield assemblies employing microfins 8, the number of microfins on the end 6a of the base of each fin blade is from about 4 to about 24 microfins. Exemplary dimensions of each microfin are as follows: thickness (t) of from about 0.5 mm to about 5 mm; height (h) of from about 3 mm to about 4 mm; and length (I) of from about 1 mm to about 7 mm.

Increases in bushing sizes have led to unanticipated problems. For example, pronounced hot and cold locations occur across the length of the bushing. Also, because the emerging glass filaments are typically gathered into a strand below the center of the bushing, the filaments exiting the bushing tips from the ends of the bushing are often pulled toward the center at a larger angle than in the past. Thus, in preferred embodiments of the present invention, the fin blades are angled from the vertical such that each fin blade is parallel to the filament as the filament moves past the blade.

Additionally, we have determined that by specifically locating fins of various thicknesses along the finshield, a goal of preferentially controlled heat dissipation is achieved. In particular, by locating thinner fins adjacent to the cooler areas of the bushing, less heat is removed from the glass filaments emerging from the bushing in these areas, which equalizes the temperatures of the filaments across the bushing.

Figures 4, 5:
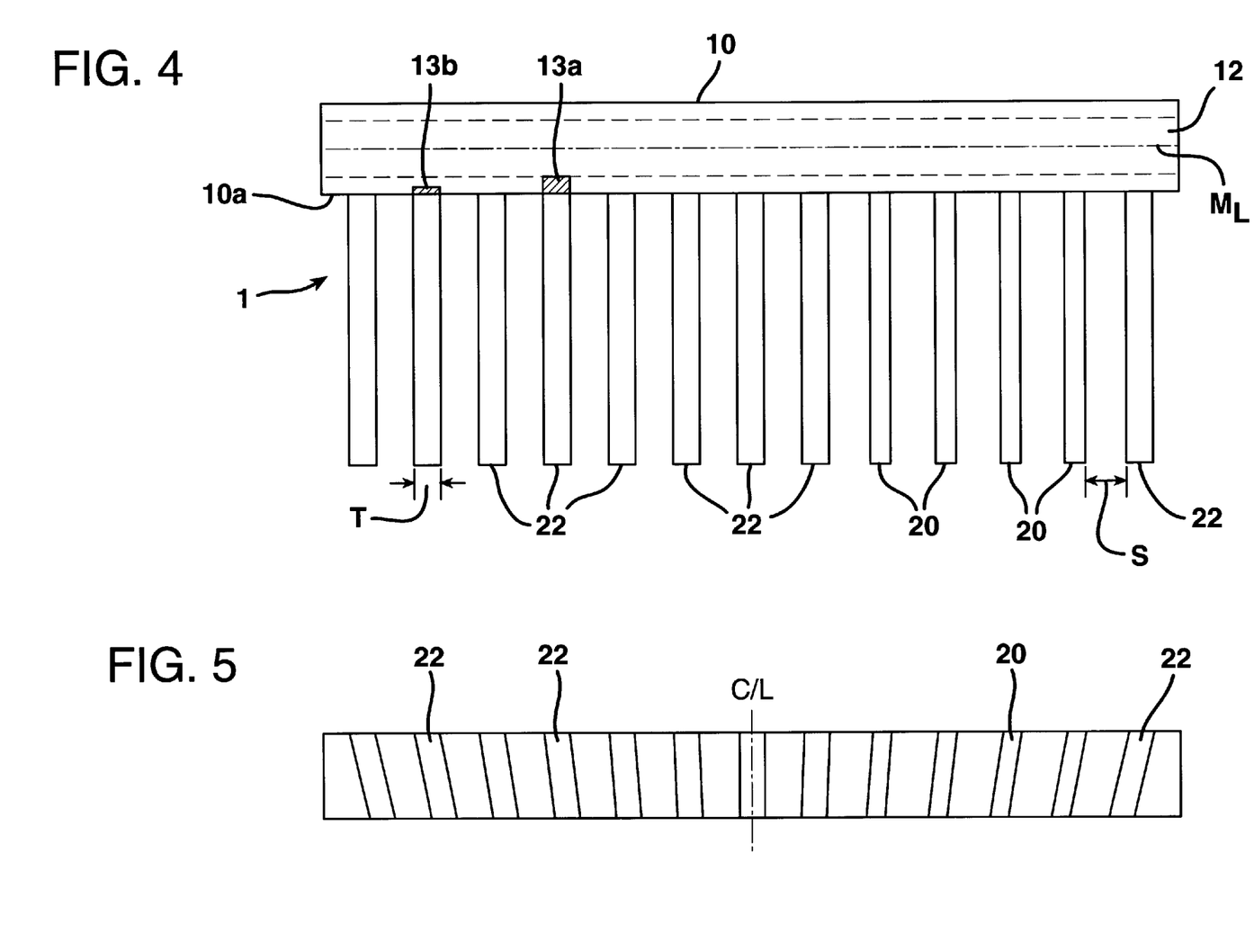
FIG. 4 is a plan view of a second embodiment of the invention.
FIG. 5 is a front elevation of the second embodiment.

As shown in FIG. 4, a finshield 1 having fin blades 20, 22 of different thicknesses (T) may be advantageously used. In those areas where less heat should be removed from the filaments emerging from the bushing, the fin blades 20 are relatively thinner than the other fin blades 22 across the finshield. The result is a substantially uniform temperature distribution in the glass filaments as they exit the finshield area. The uniform temperature distribution permits improved attenuation results because the filaments are of substantially equal temperature.

Additionally, as shown in FIG. 5, the fin blades 20, 22 may be tilted at an angle from perpendicular to the longitudinal axis of the finshield as they extend away from the center line (C/L) of the bushing. This feature is especially advantageous where the individual filaments are gathered into a strand or roving below the finshield. According to this aspect of the invention, the filaments passing between the fin blades converge into an inverted triangle, with the outer filaments converging at a greater angle than those toward the middle. However, the fins with the steepest angles are generally those in the cooler zones. Because of the cooler operating temperatures, the streams of glass may tend to curl, agglomerate, or stick to the blades after the process is interrupted, and begin to bead-down prior to restart. Using thinner blades in this area not only allows a glass filament to remain hotter as it is pulled past the blades, but also provides greater spacing between the blades and the beads after a breakout. Greater spacing reduces the occurrence of beads or filaments coming in contact with the blade. It has been discovered that using variable fin blade thicknesses not only serves to equalize the temperature of the filaments as they exit the finshield area, but also results in fewer incidences of the glass filaments or beads contacting the fins.

To achieve a uniform temperature distribution in the fibers exiting the finshield assembly, it is not necessary for the fin base portions to be in direct contact with the cooling fluid within the manifold. The fin base portions need only be in intimate contact with the manifold for the heat absorbed by the fin blade to be transferred to the manifold and carried away by the cooling fluid within the manifold. Accordingly, in this embodiment, it is unnecessary for the manifold wall 10a to be provided with slots (illustrated at reference number 13a in FIG. 4) to permit the fin base portions to penetrate the manifold interior or for the base portions to have microfins cut therein. The fins may be mounted directly onto the outside of the manifold or in shallow grooves (illustrated at 13b in FIG. 4) provided in the manifold outer wall 10a.

Figure 7:
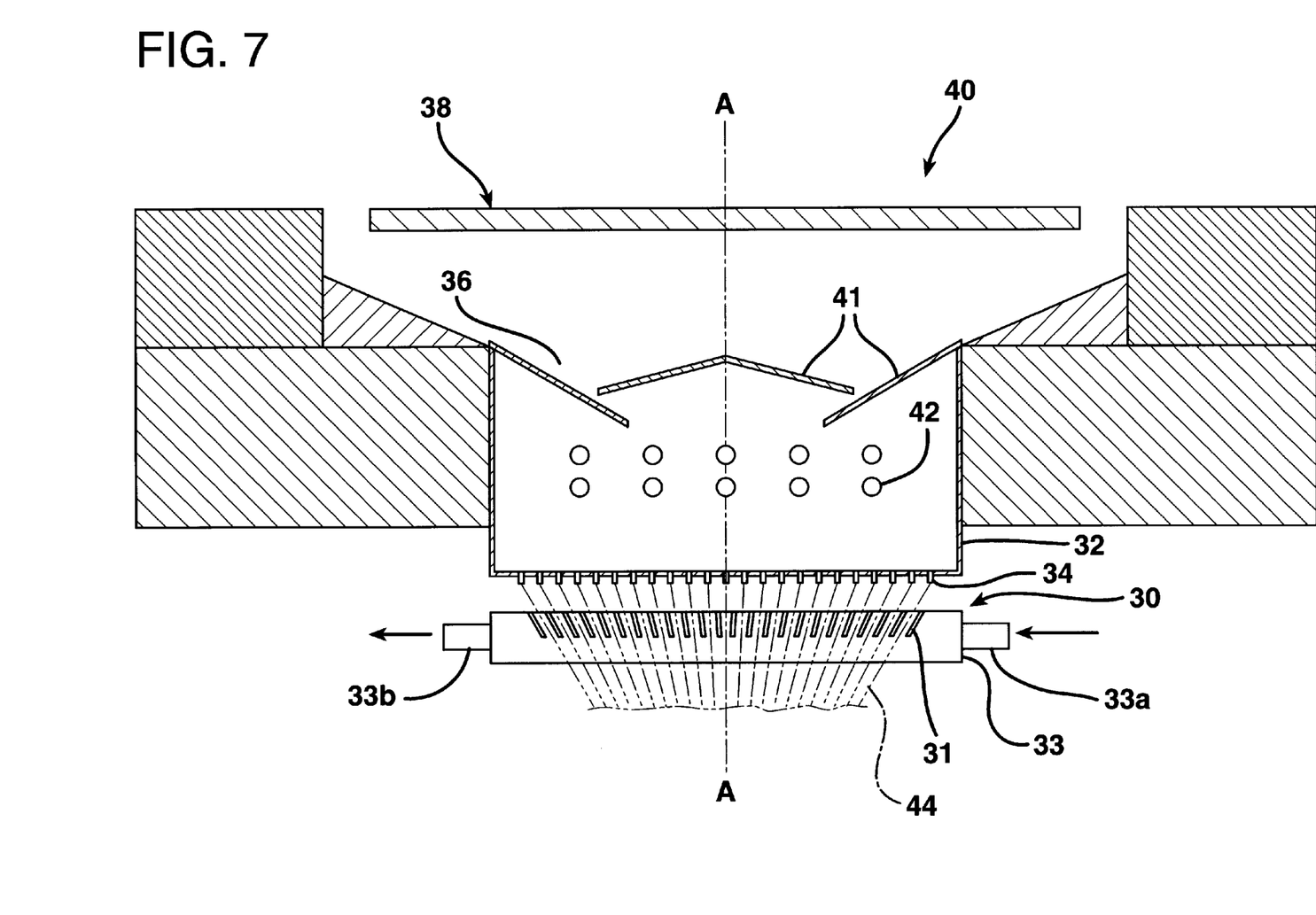
FIG. 7 shows a combination of a glass furnace bushing and a finshield.
Figure 8:
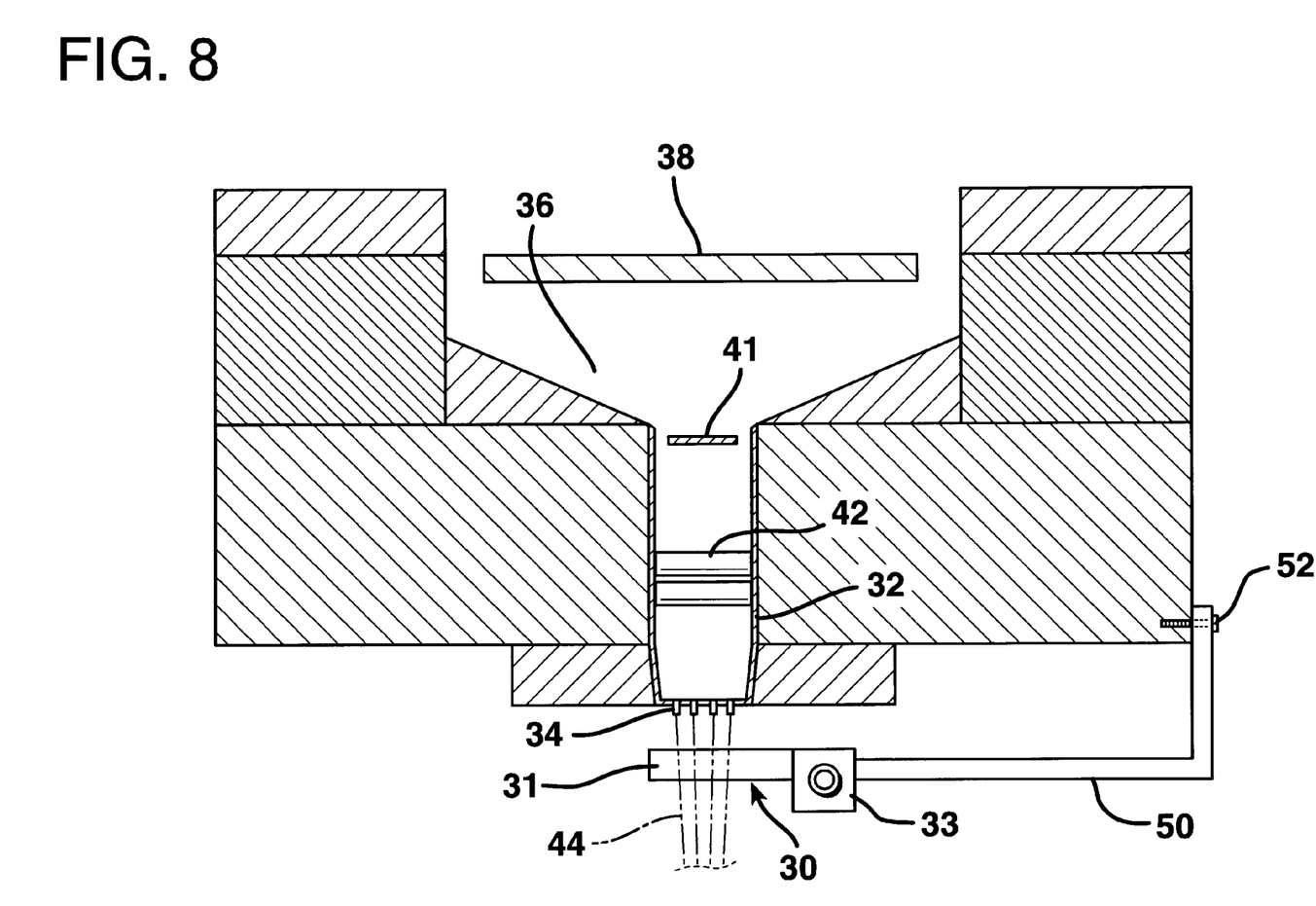
FIG. 8 is a side view in cross-section along line A—A in FIG. 7.

FIGS. 7 and 8 show a finshield assembly 30, for example, one similar to that discussed above in reference to FIG. 1, installed directly below a bushing 32 with a tip plate 34 of a glass furnace or melter 40. The bushing 32 comprises a bushing block 36 into which molten glass flows after being melted in the heating section 38 of the furnace. As the glass moves downwardly in the bushing block, its path is typically straight through. Alternatively, the molten glass may flow in a tortuous path using static means, such as baffle or mixer plates and rods, 41 and 42, within the bushing block to mix or blend the glass. The mixing is done to equalize, to the extent practicable or desired, the temperature distribution throughout the molten glass prior to it reaching the tip plate 34. The tip plate 34 closes the bottom of the bushing and comprises a plate with a plurality of holes or openings The molten glass in fiber form 44 is withdrawn through the tip plate. The fibers are pulled past the finshield 30 having fin blades 31 cooled via manifold 33, which has a flow channel connected to a cooling-fluid inlet 33a and outlet 33b. The fin blades 31 are preferably at an angle relative to vertical as illustrated in FIG. 7, to accommodate the fibers 44 being pulled to a center line below the bushing as the individual fibers are gathered into a rope-like strand, e.g., using a winding device. The finshield is supported in any suitable manner, such as using a bracket 50 and one or more bolts 52, to be directly below but slightly spaced from the tip plate 34.

A finshield according to the invention may employ either fins having microfins or fins of varying thicknesses. In a preferred embodiment of the invention, a finshield is provided which includes both (1) fin blades having microfins or teeth in the base thereof attached to a manifold having a hollow interior such that the microfins are in contact with a cooling fluid therein and (2) fin blades of variable thicknesses across the finshield length. Thus, a finshield having improved heat-absorption characteristics, providing both increased heat absorption and controlled heat absorption across the bushing area, is achieved.

Preferred embodiments of the invention are further illustrated by the following illustrative examples.

EXAMPLE 1

A finshield assembly for use in combination with a glass furnace is built using a manifold comprising a hollow copper bar. The hollow interior or flow channel for cooling fluid extends along the manifold in a direction perpendicular to the flow of the molten glass through the bushing. An exemplary manifold is about 1.25 to 1.50 inches in height ($M_H$), about 0.75 inch in width ($M_W$), and about 11.65 inches long along its longitudinal axis ($M_L$), or is otherwise suitably sized for the dimensions of the bushing and the desired throughput area for the cooling liquid. A preferred manifold interior has an oblong cross-section composed of a rectangular portion having a length of 0.5 inch and a width of 0.44 inch with semi-circular top and bottom portions each having a radius of 0.22 inch. Thus, the total length of the flow channel cross-section ($M_l$) is 0.94 inch. Slots are cut in one longitudinal sidewall of the manifold sufficiently deep to open an area in the hollow interior such that when fins with microfins in the base portion thereof, which are described in detail below, are inserted into the slots and soldered in place (e.g., using a silver solder), the manifold, with the fins attached, is fluid-tight. In one end of the manifold an inlet port is provided, and in the opposite end an outlet port is provided, to allow circulation of a cooling fluid.

The fin blades are of solid copper, with a height (H) of about 1.50 inches and a length (L) of from about 3.80 inches to 4.40 inches. The fin blades are 0.129 inch thick (T), except that the fins located below the cooler bushing zones are about 0.104 inch thick. The fins are attached to the manifold along the length thereof and are spaced from each other at a distance (S) of from about 0.498 inch to 0.544 inch.

The microfins, which enter into the coolant flow channel of the manifold and are depicted in FIG. 9, are manufactured in such a manner that the microfins have a length (I) equal to the thickness (T) of the blade—0.104 inch to 0.129 inch. Each blade has about 15 rectangular microfins formed therein such that each microfin is approximately 0.025 inches thick (t) and about 0.125 inches high (h), with a spacing (s) between each microfin of about 0.05 inches.

EXAMPLES 2A AND 2B

In Examples 2A and 2B, two finshields are made each having twenty-two copper fin blades with a spacing (S) of 0.544 inch. Each fin has a thickness (T) of 0.129 inch, a length (L) of 4.394 inches, and a height (H) of 1.5 inches. The angles of the fins from the center line of the finshield, which are represented sequentially as F1 through F22, are as follows: F1=0°; F2, F3, F4=−5°; F5, F6=−4°; F7, F8=−3°; F9 =−2°; F10=−1°; F11, F12=0°; F13=+1°; F14=+2°; F15, F16=+3°; F17, F18=+4°; F19, F20, F21=+5°; and F22=0°.

Microfins are provided in each fin blade having a thickness (t) of 0.025 inch, a length (I) of 0.129 inch, and a height (h) of 0.125 inch. In Example 2A, each fin blade has fifteen microfins with a spacing (s) of 0.05 inch. In Example 2B, each fin has eight microfins with a spacing (s) of 0.086 inch. The fin blades of each finshield are mounted in slots of a manifold having a channel height ($M_h$) of 1.5 inches such that the microfins extend into the flow channel, which is oblong.

EXAMPLES 3A AND 3B

In Examples 3A and 3B, two finshields are made each having twenty-four copper fin blades with a spacing (S) of 0.498 inch. Each fin has a length (L) of 3.80 inches and a height (H) of 1.50 inches. The fin blades of each finshield are mounted in slots of a manifold having a channel height ($M_h$) of 1.25 inches and an oblong flow channel, which has a length of 11.643 inches along the longitudinal axis ($M_l$).

For Example 3A, the angles of the fins from the center line of the finshield, which are represented sequentially across the length of the flow channel as F1 through F24, are as follows: F1=0°; F2=−8°; F3, F4, F5=−7°; F6, F7, F8=−6°; F9, F10, F11=−5°; F12, F13, F14=−4°; F15, F16, F17=−3°; F18, F19=−2°; F20, F21, F22=−1°; and F23, F24=0°. Fins F2 through F9 each has a thickness (T) of 0.104 inch, while the other fins each has a thickness of 0.129 inch.

In Example 3B, the angles of the fins from the center line of the finshield, which are represented sequentially across the length of the flow channel as F1 through F24, are as follows: F1, F2=0°; F3, F4, F5=+1°; F6, F7=+2°; F8, F9, F10=+3°; F11, F12, F13=+4°; F14, F15, F16=+5°; F17, F18, F19=+6°; F20, F21, F22=+7°; F23=+8°; and F24=0°. Fins F16 through F23 each has a thickness (T) of 0.104 inch, while the other fins each has a thickness of 0.129 inch.

While the invention has been described in detail by reference to preferred and exemplary features and embodiments, various modifications will be apparent to artisans. Thus, the invention is intended not to be limited by the foregoing description, but to be defined by the appended claims and their equivalents.

What is claimed is:

1. An apparatus for producing glass fibers, comprising a bushing with a tip plate including a plurality of openings therein from which streams of molten glass are discharged, and a finshield assembly below said tip plate, said finshield assembly comprising: (a) a manifold including a longitudinal axis and a flow channel extending along the longitudinal axis, said flow channel adapted to allow a cooling fluid to flow therein; and (b) a plurality of fins each having a blade portion and a base portion attached to said manifold, said base portion including microfins extending into said flow channel for contact by cooling fluid therein and said blade portions extending between the streams of molten glass for absorbing heat therefrom.

2. An apparatus as defined in claim 1, wherein the microfins on each said fin number from 4 to 24 and each said microfin has a thickness of about 0.025 inch, a length of from about 0.10 inch to about 0.13 inch, and a height of about 0.125 inch.

3. An apparatus as defined in claim 1, wherein said manifold comprises a wall containing slots therethrough, and said base portions of the fins are soldered to said slots in a fluid-tight manner.

4. An apparatus as defined in claim 1, wherein the flow channel has an oblong crosssectional shape having a rounded top side, a rounded bottom side, and opposing straight sides connecting the top and bottom sides.

5. An apparatus as defined in claim 4, wherein the microfins of each said fin extend into the flow channel of said manifold through one of said straight sides of the flow channel.

6. An apparatus as defined in claim 1, wherein said fins include tilted fins spaced from the center of said manifold, said tilted fins being tilted at increasing angles from perpendicular to the longitudinal axis.

7. An apparatus as defined in claim 6, wherein the angles of tilt of the tilted fins are from 0° to 8°.

8. An apparatus as defined in claim 1, wherein said fins are rectangular and have varying thicknesses.

9. An apparatus as defined in claim 1, wherein the fins adjacent the center of the manifold have a thickness greater than the thickness of the fins adjacent the ends of the manifold.

10. An apparatus for producing glass fibers, comprising a bushing with a tip plate including a plurality of openings therein from which streams of molten glass are discharged, and a finshield assembly bejow said tip plate, said finshield assembly comprising: (a) a manifold including a longitudinal axis and a flow channel extending along the longitudinal axis, said flow channel adapted.to allow a cooling fluid to flow therein; and (b) a plurality of fins, at least two of which have different thicknesses, each said fin having a blade portion and a base portion attached to said manifold, said blade portions extending between the streams of molten glass for absorbing heat therefrom.

11. An apparatus as defined in, claim 10, wherein the fins are rectangular and each Includes microfins on the base portion extending into said flow channel.

12. An apparatus as defined in claim 11, wherein the flow channel has an oblong cross-sectional shape.

13. An apparatus as defined in claim 12, wherein said fins are each at an angle of from 0 to 8 degrees.

14. An apparatus as defined in claim 13, wherein said finshield assembly further comprises slots in a wall of said manifold, said slots extending transversely of said longitudinal axis and through said wall and opening into said flow channel, said fins being mounted in said slots.

15. An apparatus as defined in claim 10, wherein said finshield assembly further comprises grooves in a wall of said manifold, said grooves extending transversely of said longitudinal axis and extending into said wall but not into said flow channel, said fins being soldered in said grooves.

16. An apparatus as defined in claim 10, wherein the thickness of some of the blades is from about 0.06 inch to about 0.11 inch and the thickness of the other blades is from about 0.08 inch to about 0.13 inch, each said blade has a height from about 1 inch to about 2 inches and a length from about 3.5 inches to about 4.5 inches, and each said blade has from 4 to 24 uniformly spaced microfins on the base portion extending into the flow channel.

17. An apparatus as defined in claim 10, wherein said fins are formed from copper and are substantially uniformly spaced from each other along the longitudinal axis.

18. An apparatus as defined in claim 10, wherein the flow channel of said manifold is circular or elliptical in cross-section.

19. An apparatus as defined in claim 10, wherein the fins of greater thickness are arranged adjacent areas of greater heat concentration along the longitudinal axis of said manifold.

* * * * *